Oct. 24, 1933. P. A. McLEOD 1,931,899

WASHER

Filed Oct. 24, 1931

Inventor
P. A. McLeod
By Watson E. Coleman
Attorney

Patented Oct. 24, 1933

1,931,899

UNITED STATES PATENT OFFICE 1,931,899

WASHER

Philip A. McLeod, Seattle, Wash.

Application October 24, 1931. Serial No. 570,948

2 Claims. (Cl. 85—9)

This invention relates to washers, and more particularly to a washer which not only has a portion thereof disposed beneath the head of the bolt, but which also has a portion overlying the head of the bolt so as to protect the bolt.

An object of this invention is to provide a hooded washer which is particularly designed for use in covering bolts used in washing machines or the like so as to prevent the corrosion of the bolt head from contacting with any articles of clothing and thereby rust the clothing.

Another object of this invention is to provide a washer of this kind which is so constructed that it can be readily mounted on any desired bolt head by merely backing off the bolt slightly so as to permit slipping the washer beneath the head.

A further object of this invention is to provide a washer of this kind which is so constructed that, if desired, a plurality of bolt heads may be readily covered or protected by the device.

The above and various other objects and advantages of this invention will in part be described in and in part be understood from the following detailed description of the present preferred embodiment, the same being illustrated in the accompanying drawing, wherein:—

Figure 1:
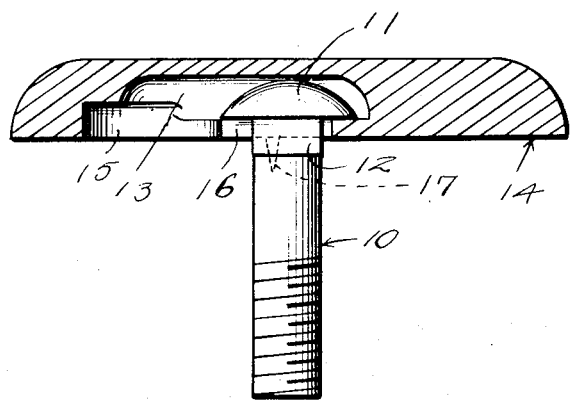
Figure 1 is a detail longitudinal section taken through the longitudinal center of a device constructed according to the preferred embodiment of this invention having a bolt mounted therein.
Figure 2:
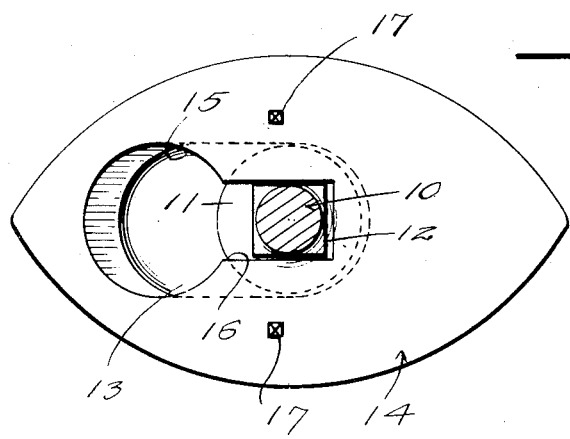
Figure 2 is a bottom plan view of the device.
Figure 3:
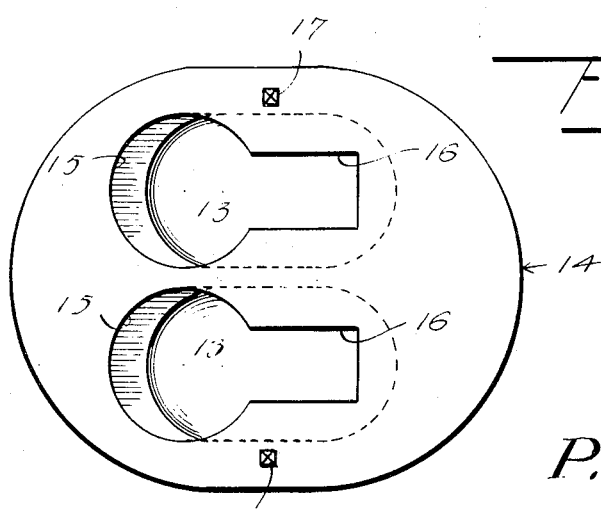
Figure 3 is a bottom plan view of a modification of the device.

Referring to the drawing wherein like numerals of reference designate corresponding parts throughout the several views, the numeral 10 designates generally a bolt having a head 11 and a squared shank portion 12 adjacent the head 11, which construction is conventional with bolt constructions. This bolt 10 is adapted to be positioned on a washing machine or other machine for holding parts of the machine together, and at the present time, certain of these bolt members, particularly the bolt members which are liable to come into contact with clothes or the like, are provided with a brass or other non-corrosive hood which will not injure clothes upon contacting therewith.

These hoods, at present, are so constructed as not to be readily mounted or removed from the bolt and on account of the very thin construction thereof, these hood members soon become split and portions of the hood contact with clothes and tear or otherwise injure the clothes.

In order, therefore, to provide a suitable washer which may be inserted beneath the head 11 of the bolt 10, I have provided a protecting washer, generally designated as 14, which has a channel 13 disposed inwardly of the lower surface thereof which terminates in a substantially annular opening 15 which is of a size to readily receive the head 11 of the bolt 10. This washer 14 is also provided with an elongated slot 16 communicating with the channel 13 which has parallel sides for receiving the squared shank portion 12 of the bolt 10 so as to prevent rotation of the bolt 10 with respect to the washer 14.

The washer 14 is also provided with a plurality of prongs 17 on the inner face thereof which are pointed so as to project into a portion of the washing machine or other article within which the bolt 10 is mounted, so as to prevent rotation of the washer 14 on the article. The head 11, when mounted in the channel 13, is protected by the upper or outer surface of the washer member 14 which constitutes a hooded washer so that no article of clothing or the like may contact with the iron head 11 of the bolt 10. As disclosed in the drawing, the washer 14 may be provided with any desired number of channels or bolt receiving openings 13 so that a plurality of bolts may be covered or protected by a single washer or hood.

In the use of this device, the bolt 10 may be disposed in the article or machine in the conventional manner with the head 11 projecting outwardly therefrom a slight degree and the hooded washer member 14 slipped over the head 11 which is received in the washer 14 in the head receiving channel 13. The washer 14 is moved laterally of the bolt 10 to the limit of the slot 16 so that the square shank 12 engages the inner end of this slot 16. The bolt 10 may then be tightened in the conventional manner so that the prongs or pins 17 will project into the article to which the bolt is applied so that the washer 14 will not readily rotate or become loosened in the event the bolt 10 is slightly loosened through vibrations or the like. When it is desired to remove or replace the washer 14, the bolt 10 may be backed off slightly so as to loosen the bolt from the article to which it is applied and the washer 14 may then be moved laterally of the bolt so that the head 11 will pass through the annular aperture 15.

It is, of course, understood that various changes and modifications may be made in the details of construction and design of the above specifically

I claim:—

1. A washer of the character described comprising a body member having an elongated channel opening on the inner face thereof, inwardly extending shoulders formed with the body and extending partially across the channel, the abutting edges of said shoulders being adapted to engage the sides of a bolt shank having the head thereof positioned within the channel whereby to maintain the bolt against movement with respect to the body, and a plurality of prongs formed with the body and extending outwardly of the inner face thereof whereby to prevent turning of the body with respect to the article engaged by the bolt.

2. A washer of the character described comprising a body member provided with an elongated channel opening on the inner face thereof, the ends of the channel terminating inwardly of the terminal ends of the body, inwardly extending shoulders formed with the body and extending partially across a portion of the channel, the abutting edges of said shoulders being adapted to engage the sides of a bolt shank having the head thereof positioned within the channel whereby to maintain the bolt against rotary movement with respect to the body, and a prong formed with the body and extending outwardly of the inner face thereof whereby to prevent turning of the body with respect to the article engaged by the bolt.

PHILIP A. McLEOD.